United States Patent [19]
Johnson

[11] Patent Number: 6,078,667
[45] Date of Patent: Jun. 20, 2000

[54] GENERATING UNIQUE AND UNPREDICTABLE VALUES

[75] Inventor: Donald B. Johnson, Manassas, Va.

[73] Assignee: Certicom Corp., Ontario, Canada

[21] Appl. No.: 08/729,012

[22] Filed: Oct. 10, 1996

[51] Int. Cl.⁷ .................................................. H04L 9/00
[52] U.S. Cl. .......................................... 380/44; 380/46
[58] Field of Search ............................ 380/44, 46, 47

[56]         References Cited

U.S. PATENT DOCUMENTS

| 4,193,131 | 3/1980 | Lennon et al. . | |
| 4,819,267 | 4/1989 | Cargile et al. | 380/44 |
| 4,956,863 | 9/1990 | Goss | 380/47 |
| 5,208,853 | 5/1993 | Armbruster et al. | 380/47 |
| 5,440,640 | 8/1995 | Anshel et al. | 380/47 |
| 5,734,720 | 3/1998 | Salanicoff | 380/47 |

FOREIGN PATENT DOCUMENTS

| 0 197 392 | 10/1986 | European Pat. Off. . |
| 0 534 420 | 3/1993 | European Pat. Off. . |

*Primary Examiner*—Salvatore Cangialosi
*Attorney, Agent, or Firm*—Baker & Maxham

[57] ABSTRACT

An integer for a private key is generated utilising a pair of components that are combined in a fixed predictable manner. The first component is generated from a sequencer such as a counter that generates non-repeating distinct value and the second component is generated in a random manner. By combining the components the integer has a unique and unpredictable value.

14 Claims, 2 Drawing Sheets

GENERATING UNIQUE AND UNPREDICTABLE VALUES

The present invention relates to public key encryption systems.

Public key encryption systems utilize a private key and a public key to establish a secure exchange of information. The keys are mathematically related so that one may be used to encrypt a message and the other used to recover the message. A typical system will utilise a long term private key and a corresponding public key which is typically authenticated by certifying authority to indicate the owner of the key and a short term of session private key with the corresponding public key to encrypt a particular message. The keys may be used to hide the contents of the message, as in an encryption protocol or may be used to authenticate a message, as in a digital signature protocol.

The private key is typically an integer of predetermined length and the public key is obtained by operating on the integer with a known function. One of the more robust of the established techniques is to exponentiate a generator of a multiplicative group with the integer and rely upon the intractability of the discreet log problem to maintain the secrecy of the integer. In a particularly beneficial implementation of such a system, the integer may be used as a multiplier of a point on an elliptic curve over a finite field with the resultant point used by the public key. This exponentiation ensures that the private key cannot be derived from the public key provided the underlying field is of sufficient size.

While the private key may not be derived from a single examination of the public key other attacks may be mounted based on examination of a large number of messages. The selection of the private key is therefore important in the overall security of the system and is particularly important in those protocols that update the short term private key on a regular basis. Any correlation between successive public keys may yield the secret key and thus render the transmissions vulnerable.

In order for the private key to be acceptable therefore it must be both unique and unpredictable. Normally it is assumed that a randomly generated number will meet these criteria but it can be shown that there is a relatively high probability of the same integer being selected randomly, the so-called "birthday surprise". Accordingly, a monitoring of the messages may yield a common key from which the private key can be derived.

It is therefore an object of the present invention to provide a method and apparatus for selecting an integer for use as a private key.

In general terms the present invention provides an integer formed from two components. The first component is generated in a unique manner through the use of a sequencer that changes at each key generation. The second component is generated randomly, such as by a random number generator, so as to be unpredictable. The two components are combined to provide an integer that is both unpredictable and unique.

The two components may be combined by concatenation in either order.

An embodiment of the invention will now be described by way of example only with reference to the accompanying drawings, in which FIG. 1 is a schematic representation of a data communication system;

Figure 1:

Referring therefore to FIG. 1, a data communication network 10 includes a pair of correspondents 12, 14 interconnected by a communication line 16. Each of the correspondents 12, 14 has a respective private key $k_a$, $k_b$ and a corresponding public key $p_a$, $p_b$ that is mathematically related to the private key. Typically the private key k is an element in a multiplicative group over a finite field and the public key is the exponent $\alpha^k$. For encrypting a message, the correspondent 12 may use the public key $p_b$ of the correspondent 14 to encrypt the message and transfer it over the link 16 as cyphertext. The correspondent 14 may then decrypt the message with the private key $k_b$ to recover the plaintext.

Figure 2:
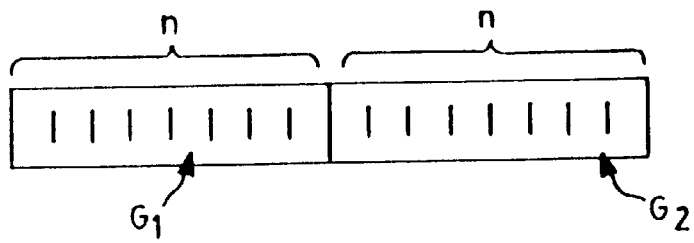
FIG. 2 is a representation of the integer.
Figure 3:
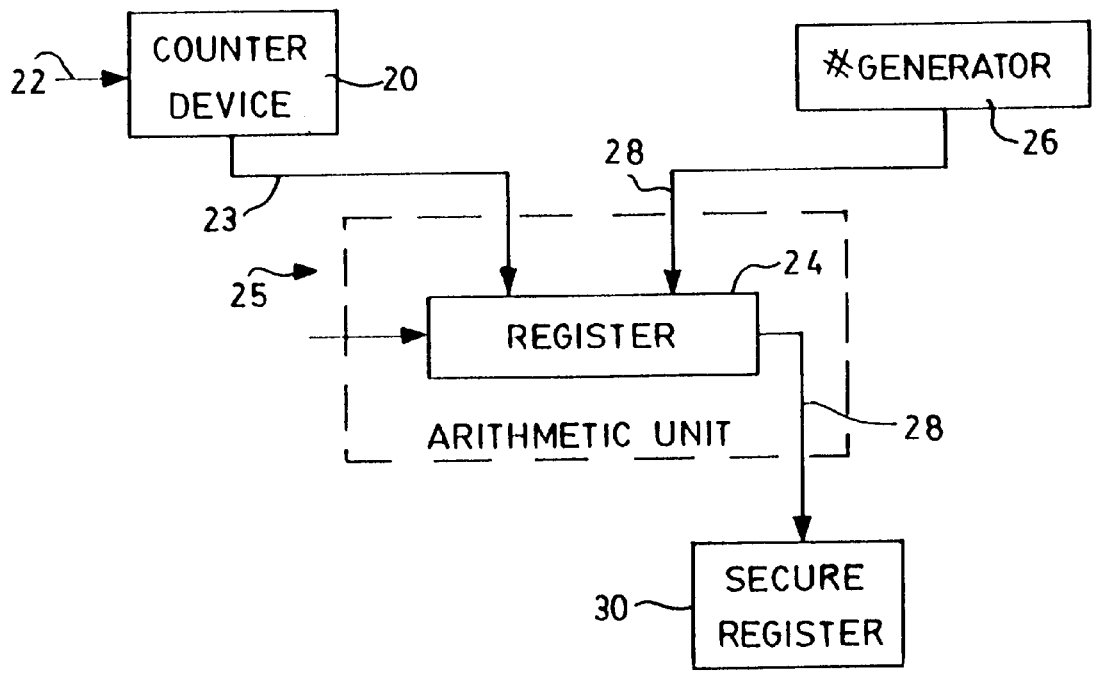
FIG. 3 is a schematic representation of the apparatus used to generate an integer for use as a private key.

Similarly, a message may be signed by the correspondent 12 using his private key $k_a$ and may be authenticated by the correspondent 14 using the public key $p_a$. Such protocols are well known and generally referred to as Diffie-Hellman public key exchanges or El Gamal signature schemes and need not be described further at this time. long and chosen so as to be unique and unpredictable. As shown in FIGS. 2 and 3, the integer k is formed from a pair of components, $G_1$ and $G_2$ respectively, each of which is n bits long and which are combined to provide an integer k with the requisite attributes.

The component $G_1$ is generated from a sequencer that generates a non-repeating distinct value over a finite range. In the preferred embodiment this is in the form of a n-bit counter 20 which is incremented by a control signal 22 after each selection of a new key k. The control signal 22 increments the counter 20 by a fixed interval, typically a single count so that a non-repeating progressively varying integer is provided at the output 23. Output 23 is connected to an arithmetic unit 25 which includes a shift register 24. The output of the counter 20 is transferred to the first n cells of the register 24.

The component $G_2$ is generated from a random number generator 26 which generates the a n-bit random bit string at its output 28. The output 28 is connected to the second n cells of the shift register 24 so as to be concatenated with the output from the counter 20 and produce a n-bit integer that is used as the subsequent private key k. The contents of the shift register 24 are then retrieved and the resultant integer stored in secure register 30 as the private key $k_a$.

The counter 20 provides a unique component by virtue of its progressive iteration whilst the random number generator 26 provides an unpredictable component. By combining the two components an integer with the requisite attributes is obtained.

The counter 20 may be arranged to increment at intervals greater than 1 and may increment irregularly if preferred to avoid a pattern to the component $G_1$. Provided the counter 20 continues to increment, the component $G_1$ will be unique. If the counter 20 attains a full count, ie. it exhausts the finite range, further key selection is inhibited.

The component $G_1$ is shown as preceding the component $G_2$ but the order could be reversed or the components interlaced. In general the components can be combined in a fixed predictable manner. Similarly the length of the components could be different if preferred.

Figure 4:
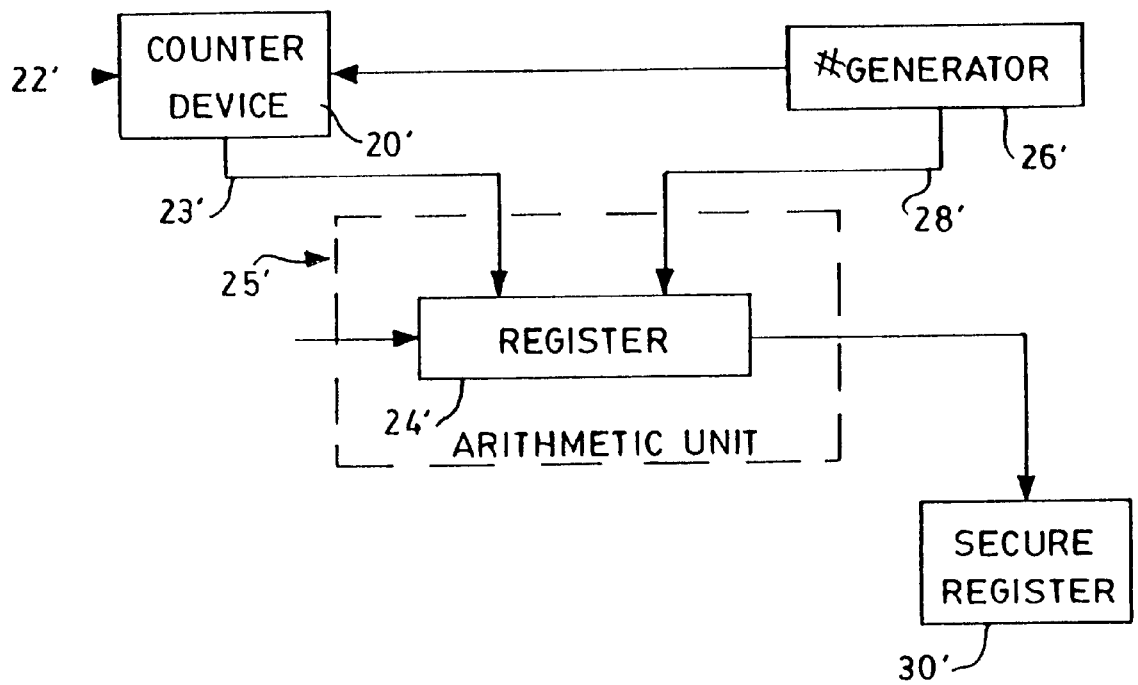
FIG. 4 is a schematic representation of a second embodiment; of the apparatus

An alternative embodiment is shown in FIG. 4 where life reference numerals will be used with like components with a suffix 'added for clarity. Referring therefore to FIG. 4, the output 28' of the random number generator 26' is used as the initial input 22' to the counter 20'. The counter 20' increments the count to provide a unique component $G_1$ but the initial value of the counter is not predictable.

Figure 5:
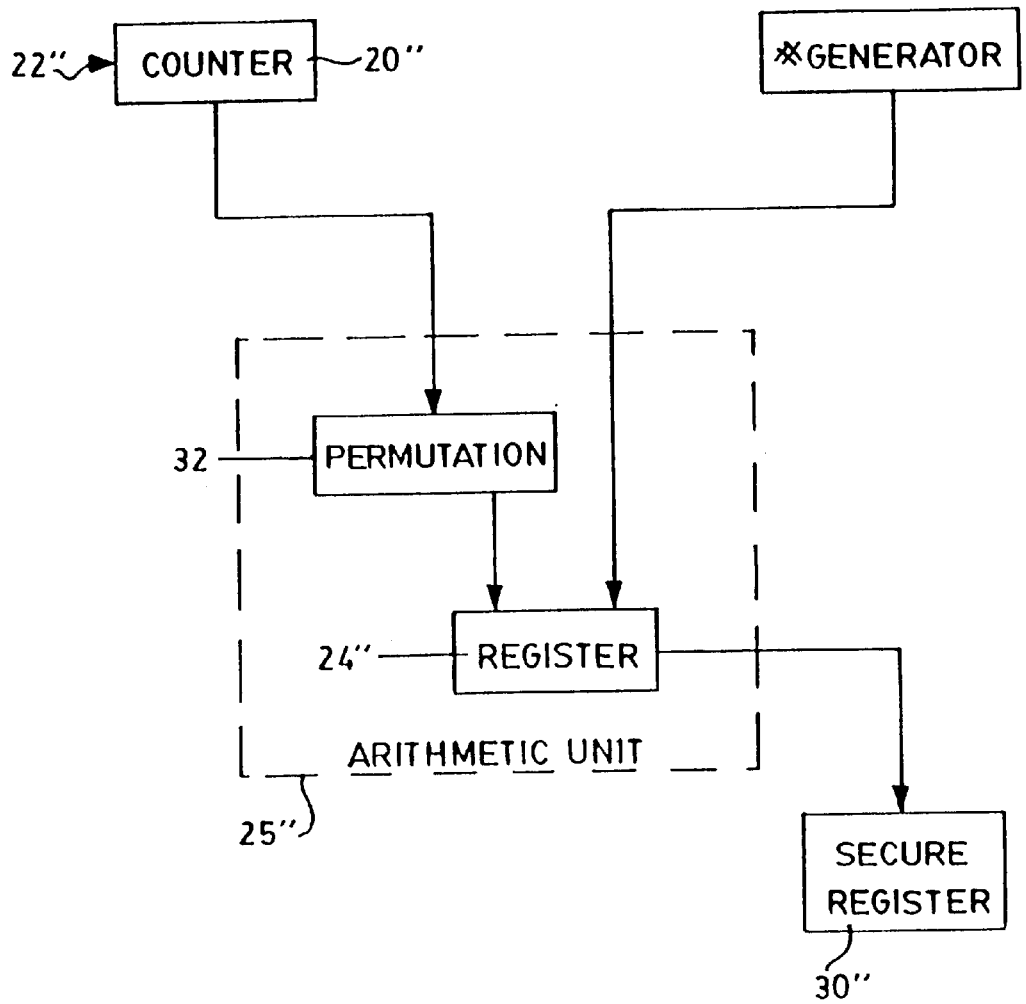
FIG. 5 is a schematic representation of a third embodiment of the apparatus.

As a further embodiment, as shown in FIG. 5 with a suffix "added to lie reference numerals, the output of the counter 20" is used as an input to an permutation unit 32, such as a DES encryption chip. The permutation unit 32 applies an encryption algorithm to the count in a predictable manner but since the input to unit 32 is unique the output will similarly be unique. The output of the unit 32 is then used as the component $G_1$ in the register 24.

In the above embodiments, the component $G_1$ has been generated using a counter 20. Other sequencers such as a linear feedback shift register or a deterministic array may be used provided a non-repeating distinct value is obtained. The sequencer may either increment from an initial value or decrement from that value to provide the unique component.

I claim:

1. A method of generating an integer for use as a private key in a public key encryption scheme comprising the steps of utilizing as a first component an output from a sequencer to provide a unique element to said integer, utilizing as a second component a randomly generated integer, combining said first component and said second component to provide said integer, and incrementing said sequencer prior to generation of a subsequent integer, whereby each generation provides a unique and unpredictable integer for use as said private key.

2. A method according to claim 1 wherein said first and second components are concatenated.

3. A method according to claim 2 wherein said first component precedes said second component.

4. A method according to claim 1 wherein said second component is utilized to set said sequencer.

5. A method according to claim 1 wherein said output from said sequencer is permuted prior to utilization as said first component.

6. A method according to claim 5 wherein said permutation is performed by an encryption algorithm.

7. A method according to claim 1 wherein said sequencer is a counter that increments.

8. A method according to claim 7 wherein said counter increments uniformly.

9. A method according to claim 7 wherein said counter increments non-uniformly.

10. Apparatus for generating a private key for use in a public key encryption scheme comprising a counting device to provide a non-repeating progressively varying integer, and having a first output, a number generator to generate numbers in an unpredictable manner and having a second output and an arithmetic unit to receive said outputs and combine said integer and said number to produce a unique and unpredictable integer, an output device to retrieve said integer from said arithmetic unit for use as a private key and a control signal to increment said counting device prior to a subsequent operation of said output device.

11. Apparatus according to claim 10 wherein said arithmetic unit includes a shift register to receive said outputs.

12. Apparatus according to claim 11 wherein said outputs are concatenated.

13. Apparatus according to claim 10 wherein said arithmetic unit includes a permutating device and said first output is connected thereto.

14. Apparatus according to claim 13 wherein said permutating device is connected to said shift register.

* * * * *